United States Patent Office 3,541,216
Patented Nov. 17, 1970

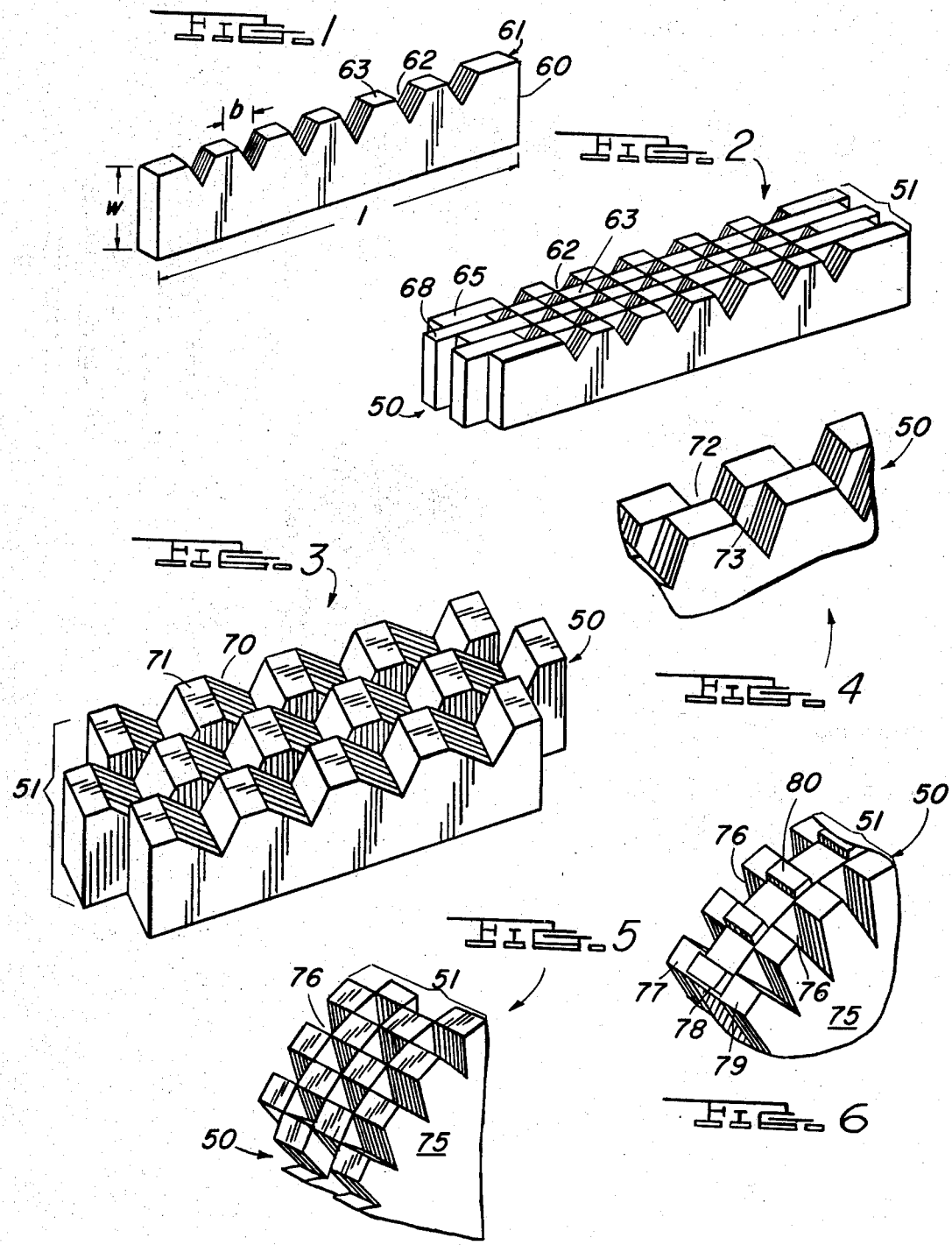

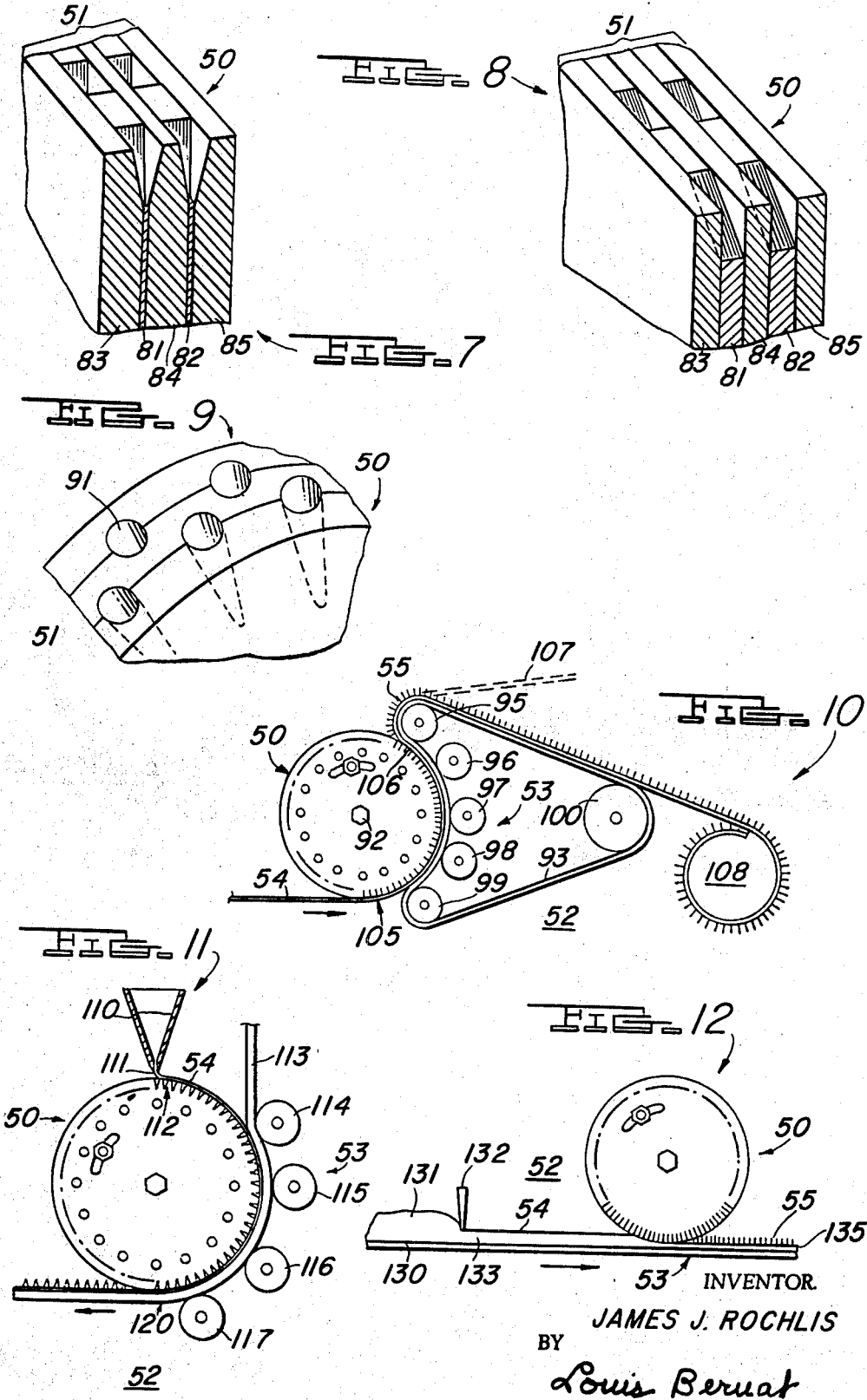

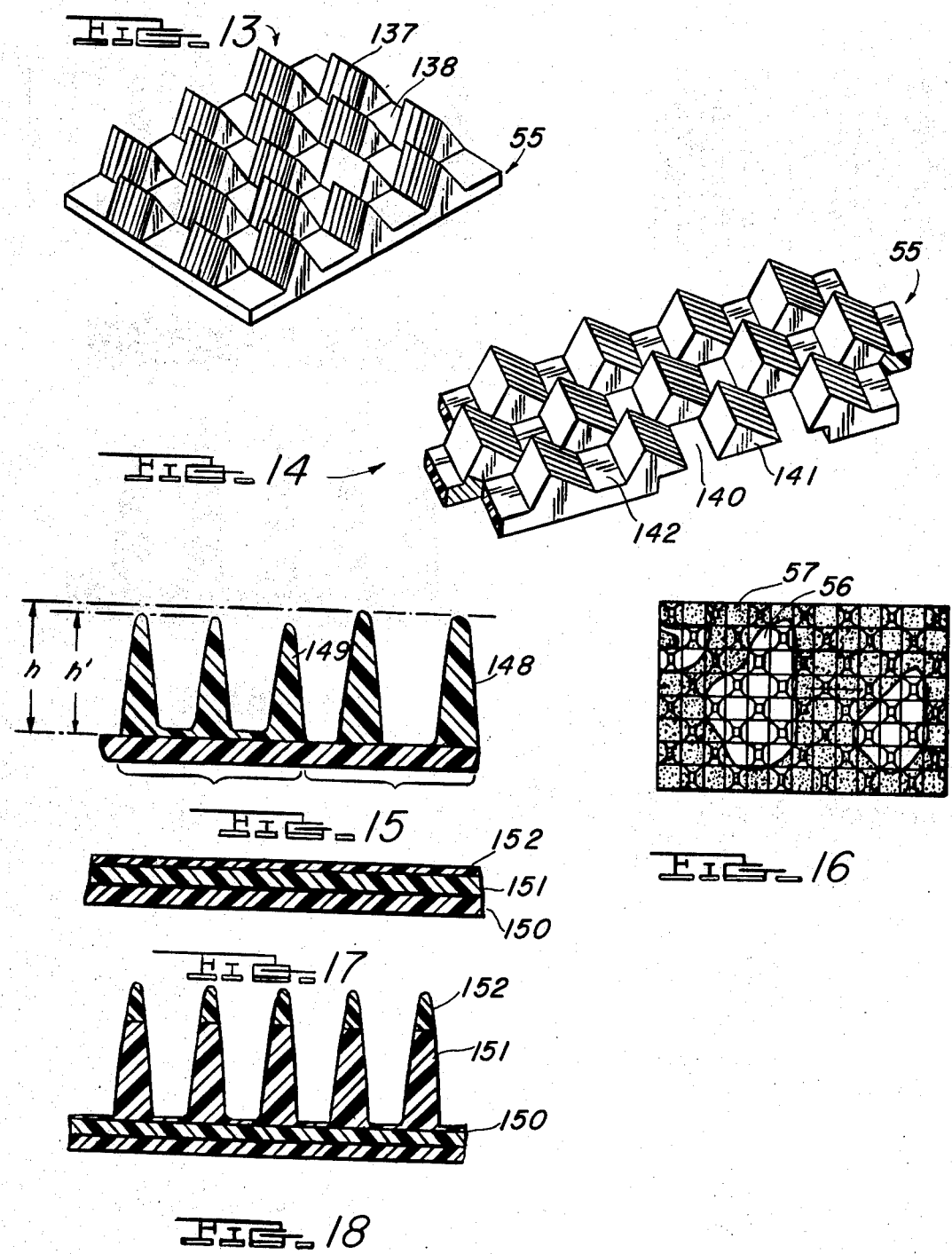

3,541,216
PROCESS FOR MAKING AN EMBOSSED PRODUCT
James J. Rochlis, New York, N.Y., assignor to Chris-Craft Industries, Inc., New York, N.Y., a corporation of Delaware
Continuation-in-part of application Ser. No. 641,714, Mar. 24, 1967, which is a division of application Ser. No. 313,356, Oct. 2, 1963. This application Aug. 26, 1968, Ser. No. 755,413
Int. Cl. B29c 21/00; B29d 7/14
U.S. Cl. 264—293        2 Claims

ABSTRACT OF THE DISCLOSURE

An embossing mold is made from an assembly or lamination of plates, each plate having recesses along an edge thereof. A sheet of pre-softened plastic material is processed and pushed under mild pressure into the embossing surface formed by the recesses. This embosses the thermoplastic material with a contour complementary to the aggregate contours formed by the recesses. A special effect is produced when various thermoplastic materials are used, and the thermoplastic material has expansion or shrinkage characteristics related to the heat absorption due to color or other thermal properties so that sculptured effects are in register.

This is a continuation-in-part of my earlier copending application Ser. No. 641,714, filed Mar. 24, 1967, and now abandoned, and which in turn was a division of my earlier application Ser. No. 313,356, filed Oct. 2, 1963, entitled Apertured and Staggered Mold Pile Product, now U.S. Pat. No. 3,312,583, granted Apr. 4, 1967, which covers the embossed pile end product.

This invention relates to a method of embossing for making pillar or pile-like material.

In the past, molds have been designed to produce plastic or rubber-like material having tufts or piles projecting therefrom. However, these materials have looked like plastic or rubber—utilitarian in nature, but somewhat less than aesthetic to the eye. The cost went up when efforts were made to improve the appearance of the material, but the results were less than satisfying. Among other things, there was no easy, low-cost way of combining a mold, color and material to provide a perfectly matched pattern of selectably varying texture coinciding with the color or other physical properties of the material.

Accordingly, an object of my invention is to provide a low-cost way of making new and improved materials which both retain the wear qualities of comparable plastic and rubber-like materials and achieve an aesthetically appealing appearance. In this connection, an object is provided a very simple and easy-to-use embossing method for molding the material. A further object is to provide an inherently automatic register or collation between the color and the texture of the material without adding any appreciable cost to the apparatus.

Another object of the invention is to provide a process having general utility for the manufacture of a great variety of products. More particularly, an object is to provide for the manufacture of an entire line of products ranging from, say, a thin sheet of cloth to a thick carpeting or from an insulating material to a cushion.

In keeping with an aspect of the invention, a plurality of recessed or notched plates are stacked in a laminate, the plate edges forming a continuous embossing surface. A sheet of pre-softened material is squeezed, pushed and formed under mild pressure into these notches similar to the extrusion coating process thereby embossing the surface of the material with an imprinted contour which is complementary to the aggregate edges of the plates. The material may have a colored pattern pre-printed or formed thereon. Each color then absorbs or reacts to heat in a different manner so that the embossed material expands or shrinks at different rates, thus providing a sculptured effect with the material surface and color varing in perfectly registered pattern. Also, the pre-softened material may be a matrix material mixed with particle compositions having different softening or setting characteristics. By a combination of color and particle composition characteristics, still other variegations may be produced. In combination with pigmentation and color dyestuffs, the heat absorbing characteristics of the plastic composition may be altered by combining varying molecular weight compositions, by introducing various plasticizers, and by varying the composition admixture of different thermoplastic materials, extenders, stabilizers and plasticizers.

These and other objects and features of the invention, along with the manner of achieving them, may be understood best from the following description taken in conjunction with the attached drawings in which:

FIG. 1 is a perspective view of a single plate or lamina having a recessed or notched edge;

FIG. 2 is a perspective view of a plurality of plates constructed and notched as taught in FIG. 1 and assembled together in a laminae to provide a single embossing mold;

FIGS. 3 and 4 disclose alternative ways of assemblying the plates, shown in FIG. 2, but with the various notches offset from each other to vary the embossed texture of the end product;

FIG. 5 is a perspective view which shows yet another embodiment of the invention wherein the notched plates are circular disks assembled together to provide a cylindrical embossing surface;

FIG. 6 is a perspective view which shows an alternative arrangement wherein disk-shaped, notched plates are interspersed with other plates having upstanding teeth projecting therefrom;

FIG. 7-9 are a series of perspective views of the laminate mold showing several exemplary ways of modifying the notches in order to increase the variety of surface textures available from the embossing mold;

FIGS. 10-12 are schematic disclosures of various machines for applying the mold pressure which pushes a pre-softened sheet of material into a mold of the type disclosed in FIGS. 1-8;

FIGS. 13 and 14 are perspective views showing exemplary forms of the embossed material produced by the inventive apparatus and process; and FIGS. 15-18 are schematic disclosures of the manner in which color and apparatus may be coordinated to produce a pleasing appearance wherein surface texture and material color coincide perfectly.

There are three major aspects of the invention which may be broadly described as (A) a mold (FIGS. 1-9), (B) a machine using the mold (FIGS. 10-12), and (C) a combination of resin and compound ingredients including polymer and copolymer resins, plastisols, plastigels, stabilizers, plasticizers, pigments and dyes in order to provide a desired processed end product. These three aspects are combined to provide a singular way of producing a new and novel material.

The mold 50 includes a lamination of low-cost fabricated or stamped plates, each plate having recessed or notched edges to provide an aggregate surface 51 having a total contour which is complementary to a desired contour of the end product. The machine 52 includes the mold 50 and clamping means 53 for applying a mild pressure to squeeze or push a sheet 54 of a modified or pre-sofetened material into the embossing recesses on the surface of the mold 50 and thereby produce an end product material 55 embossed with an imprinted contour which is complementary to the contour at the surface of the mold 50. Among other things, light and dark colors 56, 57 (FIG. 16) appearing in the pre-softened material may vary the heat responsive characteristics of the product causing expansion or shrinkage thereof thus coordinating color, composition, physical configuration and texture.

The manner in which these and other aspects of the invention are combined to provide the singular end product may be understood best from the following description of significant design details.

Each lamina plate 60 (FIG. 1) in the mold 50 has a fairly uniform length $l$ and width $w$. Thus, a plurality of them may be assembled together to provide a continuous surface 51. The upper edge 61 of each lamina is notched, as at 62, to provide an embossing recess. A number of these notches are formed along the edge 61, with a land area 63 separating each recess or notch from its neighboring recesses or notches. As will become more apparent, the breadth $b$ and depth $d$ of these notches may vary over an almost infinitely wide range dictated more by the desired appearance of the end product contours than by any other single factor. However, so that the record may be complete, it may be well to here state that one exemplary product having an outstanding commercial success is made on a mold where the breadth is approximately one sixteenth of an inch and the depth is approximately one eighth of an inch, respectively. Other mold configurations may have breadth dimensions that vary between one thirty-second of an inch to approximately five sixteenths of an inch depending on the characteristic of the material and the measured height of the displacement necessary to produce a desired embossed surface. In addition, it has been found in vented and non-vented molds that a draft angle from about four to nine degrees is extremely helpful in releasing the product from the mold, especially where the plastic composition tends to grip the mold. In addition, different shrinkage factors after forming, which may range from about no shrinkage up to as much as four percent, effect proper release and size configuration of the final product.

A plurality of plates, constructed as taught in FIG. 1, are placed side-by-side, as shown in FIG. 2. Preferably, the recesses or notches 62 on one plate are placed adjacent the lands 63 on the next adjacent plate—as notch 62 on plate 65 is shown adjacent land 63 on plate 68. However, this placement is not critical. As shown in FIG. 3, the notches 70 may be much larger than the lands 71 to give one effect; or, as shown in FIG. 4, the notches 72, 73 may be positioned in an offset, side-by-side manner to give an entirely different effect.

An important consideration is the air or other gas which may tend to be trapped in the points of the notches. Obviously, the gas must escape at least to a degree wherein there is no deformation at the embossed tips of the material pressed into the recesses of the mold. On the other hand, it is also important for the plates to be pressed together with a force adequate to prevent the formation of an interplate flash within the space between the lamina plates. Mold structures may be vented or non-vented; although, in actual use, the non-vented mold is preferred since in a laminated mold there is some venting even though extremely high clamping pressures are used to hold the mold together in order to withstand post-extrusion or calendering pressures in the range from about 20 to 200 pounds per square inch. Vents are generally in the fractional mil range, and variations in surface thickness and configurations may provide some leakage. In addition, the processing thermal heat of the mold does modify the molding conditions. Excellent reproduction and register have been accomplished in the use of these molds provided that the terminal boundaries are not too sharp. In addition, the plastic product will tend toward having rounded peripheral surfaces.

The foregoing description describes lamina plates having a length $l$ and a width $w$. While this general rectangular configuration proivdes a distinctively useful mold another, and perhaps more useful, mold may be provided when each of the recessed plates 75 is circular, as shown in FIGS. 5 and 6. Here again the outer edge of the plates is notched as at 76, to provide a series of recesses or openings for embossing the material pressed therein. Thus, when a plurality of the plates 75 are assembled together, the mold becomes cylindrical in form. This form has special utility for use in continuous processing.

Also, the foregoing description describes recesses or notches having a breadth and depth which form a simple and unsophisticated pile or pillar having a relatively unadorned appearance. To provide a more attractive product, the notches may be given unique contours. The above-identified U.S. Pat. No. 2,312,583 shows may different shapes of recesses, pillars and pile which are exemplary of an almost infinite variety of designs. Therefore, it is enough here to disclose only the general principles which are involved.

In FIG. 6, for example, three disks 77, 78, 79 are assembled in a side-by-side arrangement. The two disks 77, 79 have notches 76 at the periphery. A separating plate 78 has teeth 80 projecting from its periphery. Thus, the product embossed by the aggregate surface of this cylindrical mold has upstanding tufts (formed in recesses 76) separated by pits or apertures formed by the teeth 80.

In FIGS. 7 and 8 the notched plates 81, 82 are separated by unnotched plates 83, 84, 85. Therefore, the flnal product has the form of a sheet of upstanding tufts separated by flat land areas. In the case of FIG. 7, the notched and unnotched plates have tapered upper edges. The notched plates 81, 82 flare outwardly, and the unnotched plates incline inwardly. Therefore, the tufts embossed in the recesses of this mold have a generally pyramidal shape. Vents for the expulsion of gases may be created between the boundary surfaces of the plates 81, 82.

FIG. 9 is included to show that the notches do not necessarily have to have angular lines. Instead, the notches, such as 91, have a generally conical taper. Therefore, the embossed end product will have a gentle taper with a generally circular cross section.

Upon reflection, it should now be apparent that the general shape of the recesses may have almost any form that comes to mind. In fact, an important aspect of the invention is that the end product may have a very wide range of different appearances which may be precisely controlled.

The machines (FIGS. 10–12) for using the molds to make the embossed end product may take any of a number of suitable forms. Each machine applies a mild pressure to push or squeeze a pre-softened material by post-extrusion forming into the recesses on the surface of the mold. In greater detail, the mold 50 (FIG. 10) is a cylindrical element mounted to rotate on an axis 92. An endless belt 93, trained over a series of rollers 95–100, partially wraps around an angular segment of the cylindrical mold, covering the entire length thereof. The rollers 95–99 push against the endless belt 93 with a mild pressure whch may be in the range from about 20 to 250 pounds per square inch. However, the exact pressure may vary with the pre-softened material and the desired end product effects. Pre-softening of the material may be created by heat or by partial solvation.

Any suitable material may be used if it may be pre-softened in a convenient manner, as by thermo-softening or by the use of a pre-softening solvent, and the material reproduces embossed contours imposed thereon.

Various composition of plastic extrudate materials may be used in a profile extrusion type of process, such as the vinyls, polythylenes and acetates or combinations thereof. The vinyl homopolymers, such as selectively compounded polyvinyl chloride compositions having a specific gravity in the range from about 63–95, tensile strength in the range from about 1100–3350 (p.s.i.), and ultimate elongation characteristics of about 275%–375%, have been found to be acceptable. In addition, the use of a copolymer composition such as the vinyl chloride-vinyl acetate polymers and the butadiene-styrene polymers have been found to be usable. Furthermore, increased flexibility may be achieved with the polyvinyl chloride homopolymer by the admixture with high molecular weight fatty acid esters or other plasticizers. Small amounts of stabilizers may be added during the manufacture of the vinyl plastisol to prevent slow decomposition involving the liberation of hydrogen chloride.

Numerous commercial vinyl resins are closely related to polyvinyl chloride, in that they are copolymers of a large portion of vinyl chloride and a small portion of vinyl acetate.

The use of the desired end product in indoor and outdoor applications imposes the requirement that the end product possess chemical and water resistance, heat and light stability, abrasion resistance and stain resistance. Furthermore, the processing requirement further requires that the use of the plasticizer and/or stabilizer does not impair the performance characteristic of the end product.

Formulation examples of the plastisol vinyl composition are as follows:

|  | Parts by weight | |
| --- | --- | --- |
|  | A | B |
| Homopolymer—PVC | 65 | 45 |
| Copolymer—PVC and PVAC | 35 | 55 |
| Plasticizer—TCP | 68 | 63 |
| Stabilizer system—Ba/Cd/Zn | 5 | 5 |
| Pigmentation—(dependent on color desired) | | |

Various types of plasticizers have been found to be acceptable, such as dioctyl phthalate, dicapryl phthalate, butyl benzyl phthalate and tricresyl phosphate. The stabilizer system may be the barium, cadmium and zinc system, the alkyd type polymeric materials or other compatible systems.

Along with the composition of the extrudate the molding temperature is generally in the range from about 220° to 365° F. The preferred range is generally in the upper region from about 310° to 340° F. depending on the degree of molding pressure. Furthermore, it has been found that cooling of the extrudate in the profile extrusion can be extremely critical depending on the composition and molding temperature. It shall be noted that in the present process higher molding pressures may be applied wherein external heat is initially provided to begin the operation by changing the extrudate to a semiliquid structure, and the conversion of mechanical input into heat provides the additional heat requirement.

In operation, a web or sheet of material 54 is pre-softened before it reaches the cylindrical mold 50 at the tangent point 105. From point 105, the material passes, in its pre-softened state, over the surface of the mold 50 under the mild pressure applied by the rollers 95–99. While under such mild pressure, the surface of the material 54 is embossed to an imprinted shape which is complementary to the surface of the mold 50. From the point 106 where the material 54 is peeled or stripped away from the mold 50, it is either led away (as at 107) for further processing; or, it may be rolled up (as at 108). The nature of such further processing is determined by the material that is used.

Other embodiments of the invention contemplate a combination of a hopper 110 for depositing a plastisol material 111 across the surface of the cylindrical mold at the tangent point 112. A backing sheet 113 of any suitable material is laid down over the plastisol material which is so deposited on the surface of the cylindrical mold. Then the plastisol 111 and backing material 113 are pressed against the mold 50 under a mild pressure such as 300–500 pounds per square inch applied by a number of rollers 114–117. When the embossed material is stripped away (at point 120) from the surface of the mold 50, the plastisol material is embossed with the imprint of the recesses in the mold, and it is bonded to the backing material 113.

Yet another embodiment (FIG. 12) of the inventive machine involves a backing sheet 130 on which a thick layer plastisol material 131 is applied. A doctor blade 132 controls the thickness of the plastisol material so that it forms a layer having a uniform thickness 133 when it is presented to the mold 50 where it is pressed into the surface recesses under any suitable mild pressure. Again, the end product 135 is embossed in an imprinted contour complementary to the contour on the surface of the mold.

While the invention has broad applications for use with many suitable materials, the embodiments of FIGS. 11 and 12 may use a plastisol material such as formulated in Example A deposited at about 290° to 320° F. and a backing material such as cotton or a synthetic fiber. Here the mild pressure may be of the order of 290–380 pounds per square inch.

The end product depends upon the nature of the mold, the machine for applying the embossing pressure, and the materials being embossed. In greater detail, a mold having a relatively simple and unadorned surface, such as shown in FIG. 2, produces a product (FIG. 13) having an equally simple and unadorned surface. Each notch 62 in the mold surface produces an embossed point such as 137, while each land area 63 produces a flat surface 138. A product such as this is primarily utilitarian, perhaps having a use such as a non-slip tread.

When the mold includes a number of projecting teeth, such as 80 (FIG. 6), the end product (FIG. 14) has perforations or apertures 140. Again, each recess or notch (such as 76) produces an embossed tip (such as 141), and each land area produces a flat surface (such as 142). Thus, the end product is especially useful when a porous surface is desirable.

When the surface texture appearance should be coordinated with color, the material should be initially prepared with several colors having different heat absorbing characteristics. Thus, in FIG. 16, the materials at 56, 57 are different colors which are such that the darker color pigmented material 57 absorbs more heat and expands more than the lighter color pigmented material 56. Therefore, the material at 57 fills the mold more fully, and the tufts 148 (FIG. 15) raise to a height $h$. On the other hand, the light colored material at 56 is a color which absorbs less heat, expands less, and the tufts 149 raise to only the height $h'$. Hence, the tufts on the surface of the end product material have different heights which exactly coincide with the color of the material. This gives a sculptured effect with a perfect color register. When plastic material as per Example A is used, having the colors of carbon black and titanium dioxide white, the differential between the heights $h$ and $h'$ is of the order of 0.020 to 0.030 inch when the average tuft height is about 0.250 inch.

In the embodiment of FIG. 17, the initial color distribution is horizontal, say, black at 150, white at 151, and red at 152. When molded, the tufts or piles are banded, in color, as shown in FIG. 18. Still further effects may be achieved by varying the softness or durometer ranging from about 55–75 of the material or by combining a matrix material with chips or particles of other colors or hardness. Various types of colorants may be used such as organic and inorganic pigments, dyes and pigments having special optical effects.

In any event, a judicial use of the principles described herein leads to a final end product having a perfect registration of color and molded surface effects. The register of color and effect is perfect and with no requirement for color control. In fact, the color may be variegated at random while the mold is completely uniform.

The resultant pigment pile or pillar-like plastisol material may be used not only for flooring material, shoe treads and other type of household or wearing apparel, but also for filter media whereby the material is spirally wound. In addition, the material may be pigmented with magnetic susceptible pigment, such as iron oxide, and the pillar-like material would magnetically interlock when the surfaces of the material are in register and are of opposite polarity thus producing a fastener.

Those who are skilled in the art will readily perceive other new and novel effects of and uses for the invention. Accordingly, the appended claims are to be construed broadly enough to cover all equivalents falling within the true scope and spirit of the invention.

I claim:
1. A process for making an embossed product comprising the steps of:
   (a) forming a laminated mold of plates having recesses along an edge thereof, said plates being assembled to provide an aggregate embossing surface,
   (b) pre-softening a sheet of material having a color related thermo-softening characteristic wherein said characteristic produces different expansion of the material according to the heat responsive color thermo-softening characteristic thereof,
   (c) applying said pre-softened material to said aggregate surface with a mild pressure for pushing said material into said recesses to form a sculptured configuration, and
   (d) stripping said material from said aggregate surface while preserving the sculptured configuration of the embossed contour on the surface of said material.

2. A process for making an embossed product as in claim 1 wherein the mild pressure is in the range from about 20 to 250 pounds per square inch.

References Cited
UNITED STATES PATENTS

| | | | |
|---|---|---|---|
| 2,306,732 | 12/1942 | Haxham | 18—44 |
| 2,526,318 | 10/1950 | Batten | 18—10 XR |
| 2,776,452 | 1/1957 | Chavannes | 18—10 |
| 2,803,040 | 8/1957 | Robert et al. | 18—10 |
| 3,069,721 | 12/1962 | Arni et al. | |
| 3,148,431 | 9/1964 | Berliner. | |
| 3,214,795 | 2/1965 | Hannauer et al. | 18—10 |
| 3,241,182 | 3/1966 | Kessler. | |
| 3,317,644 | 5/1967 | Takai | 18—44 XR |
| 2,928,124 | 3/1960 | Hugger | 18—10 XR |

J. HOWARD FLINT, JR., Primary Examiner

U.S. Cl. X.R.
18—10, 42, 44; 264—284, 322